United States Patent
Chen et al.

(10) Patent No.: US 7,933,960 B2
(45) Date of Patent: Apr. 26, 2011

(54) SYSTEM AND METHOD FOR SOLVING AMBIGUOUS MEANINGS OF UNKNOWN WORDS USED IN INSTANT MESSAGING

(75) Inventors: Li Chen, Cary, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 11/966,944

(22) Filed: Dec. 28, 2007

(65) Prior Publication Data
US 2009/0171937 A1 Jul. 2, 2009

(51) Int. Cl.
*G06F 15/16* (2006.01)

(52) U.S. Cl. ........ 709/206; 709/202; 709/203; 709/226; 709/229

(58) Field of Classification Search .......... 709/202–207, 709/226–229
See application file for complete search history.

(56) References Cited

U.S. PATENT DOCUMENTS

| | | | |
|---|---|---|---|
| 5,634,084 A | 5/1997 | Malsheen et al. ............. | 395/269 |
| 6,966,030 B2 | 11/2005 | Ashford et al. ............... | 715/532 |
| 7,366,759 B2 * | 4/2008 | Trevithick et al. ............ | 709/206 |
| 7,660,878 B2 * | 2/2010 | Castaldi et al. ............... | 709/221 |
| 7,797,318 B2 * | 9/2010 | Torres et al. .................. | 709/206 |
| 2004/0267891 A1 * | 12/2004 | Hoeye et al. .................. | 709/206 |
| 2006/0143138 A1 * | 6/2006 | Uehara .......................... | 705/67 |
| 2006/0143183 A1 * | 6/2006 | Goldberg et al. ............... | 707/10 |
| 2007/0067392 A1 * | 3/2007 | Torres et al. .................. | 709/206 |
| 2007/0255785 A1 * | 11/2007 | Hayashi et al. ............... | 709/204 |
| 2008/0140650 A1 * | 6/2008 | Stackpole ...................... | 709/204 |
| 2008/0288596 A1 * | 11/2008 | Smith et al. ................... | 709/206 |
| 2009/0182872 A1 * | 7/2009 | Hong ............................ | 709/224 |

* cited by examiner

*Primary Examiner* — Bharat N Barot
(74) *Attorney, Agent, or Firm* — Van Leeuwen & Van Leeuwen

(57) ABSTRACT

A system and method for identifying an unknown word's likely definition based upon a common social networking group is presented. A user receives a message and selects an unknown word in the message. In turn, the recipient client identifies a common social networking group between the sending client and the recipient client. The recipient client then uses the common social networking group to identify the unknown word's definitions using one or more unknown word repositories, such as the sending client unknown word repository, the recipient client unknown word repository, or a mutual client unknown word repository, which corresponds to a mutual client included in the common social networking group. Once the recipient client identifies the unknown word's definitions, the recipient client orders and displays the definitions based upon the common social networking group and social networking group frequency values.

20 Claims, 8 Drawing Sheets

200

| UNKNOWN WORD REPOSITORY | | |
|---|---|---|
| Unknown Word | Definition | Social Networking Group |
| DOM | Document Object Model | IT - Software |
| | Disk On Module | WiFi |
| | Distinguished Old Man | Net |
| . . . | . . . | . . . |

| USER PROFILE | |
|---|---|
| Social Networking Group | Frequency Value |
| IT - Software | 70% |
| WiFi | 25% |
| Net | 5% |
| . . . | . . . |

SYSTEM AND METHOD FOR SOLVING AMBIGUOUS MEANINGS OF UNKNOWN WORDS USED IN INSTANT MESSAGING

BACKGROUND OF THE INVENTION

1. Technical Field

The present invention relates to a system and method for solving ambiguous meanings of unknown words used in electronic communication. More particularly, the present invention relates to a system and method for determining a common social networking group of a sending client and a recipient client and using the common social networking group to identify a definition of an unknown word.

2. Description of the Related Art

Instant messaging (IM) is becoming popular as a tool for performing global business as well as for social networking. Instant messaging is an efficient tool for users across continents with different culture/languages to communicate with each other and quickly receive responses. However, a challenge found is that a user may not be able to respond quickly when a message includes "unknown words" whose meanings are dependent upon the context in which they are used. As a result, the user either sends a message back to a sending client asking for clarification, or spends time attempting to understand the meaning of the unknown word. Several reasons for unknown words are:

Abbreviations—To save time, people use acronyms and abbreviations extensively as a short cut to type an entire message.

Different knowledge domains—The same word may have a different meaning in different context. Some domains may include words or terminologies that people from other domains may have never seen.

Different Cultures/Languages—When people from different native languages send electronic messages, many words used in the electronic message may be misunderstood.

What is needed, therefore, is a system and method for reducing an unknown word's definition ambiguity by identifying the context in which the unknown word is utilized in a message.

SUMMARY

It has been discovered that the aforementioned challenges are resolved using a system and method for determining a common social networking group of a sending client and a recipient client and using the common social networking group to identify a definition of an unknown word. A sending client and a recipient client are part of a common social networking group, such as a "WiFi" social networking group or an "IT-Software" social networking group. When the recipient client receives a message and the recipient client's user selects an unknown word, the recipient client proceeds through a series of steps to identify definitions within an unknown word repository and display the definitions to the user based upon the common social networking group and social networking group frequency values.

The sending client's user and the recipient client's user create user profiles, which include social networking groups and corresponding social networking group frequency values. The social networking group frequency values correspond to the amount of time that a user converses in a particular social networking group, which is utilized to identify a common social networking group of the sending client and the recipient client.

The sending client's user and the recipient client's user also create particular unknown word repositories, which include unknown words, definitions, and social networking groups that correspond to the definitions. The invention described herein utilizes the unknown word repositories to determine an unknown word's most likely definition based upon the common social networking group.

When the sending client sends a message to the recipient client, the recipient client displays the message for the recipient client's user to view. When the user is unsure of a word's definition, the user selects the "unknown word." In turn, the recipient client identifies a common social networking group between the sending client and the recipient client by matching a sending client user profile with a recipient client user profile.

The recipient client uses the common social networking group to identify the unknown word's definitions using one or more unknown word repositories, such as a sending client unknown word repository, a recipient client unknown word repository, a global unknown word repository, or a mutual client unknown word repository, which corresponds to a mutual client included in the common social networking group. Once the recipient client identifies the unknown word's definitions, the recipient client orders and displays the definitions based upon the common social networking group and social networking group frequency values.

In one embodiment, the invention described herein accumulates the unknown word and the unknown word's corresponding definitions into other unknown word repositories. For example, when a recipient client identifies an unknown word in a mutual client unknown word repository and determines that the unknown word is not included in the sending client unknown word repository or the recipient client unknown word repository, the invention described herein adds the unknown word and its corresponding definitions to the sending client unknown word repository and the recipient client unknown word repository.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 2A is a diagram showing an unknown word repository that includes an unknown word and multiple definitions that correspond to particular social networking groups;

FIG. 2B is a diagram showing a user profile that includes social networking groups and corresponding social networking group frequency values;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
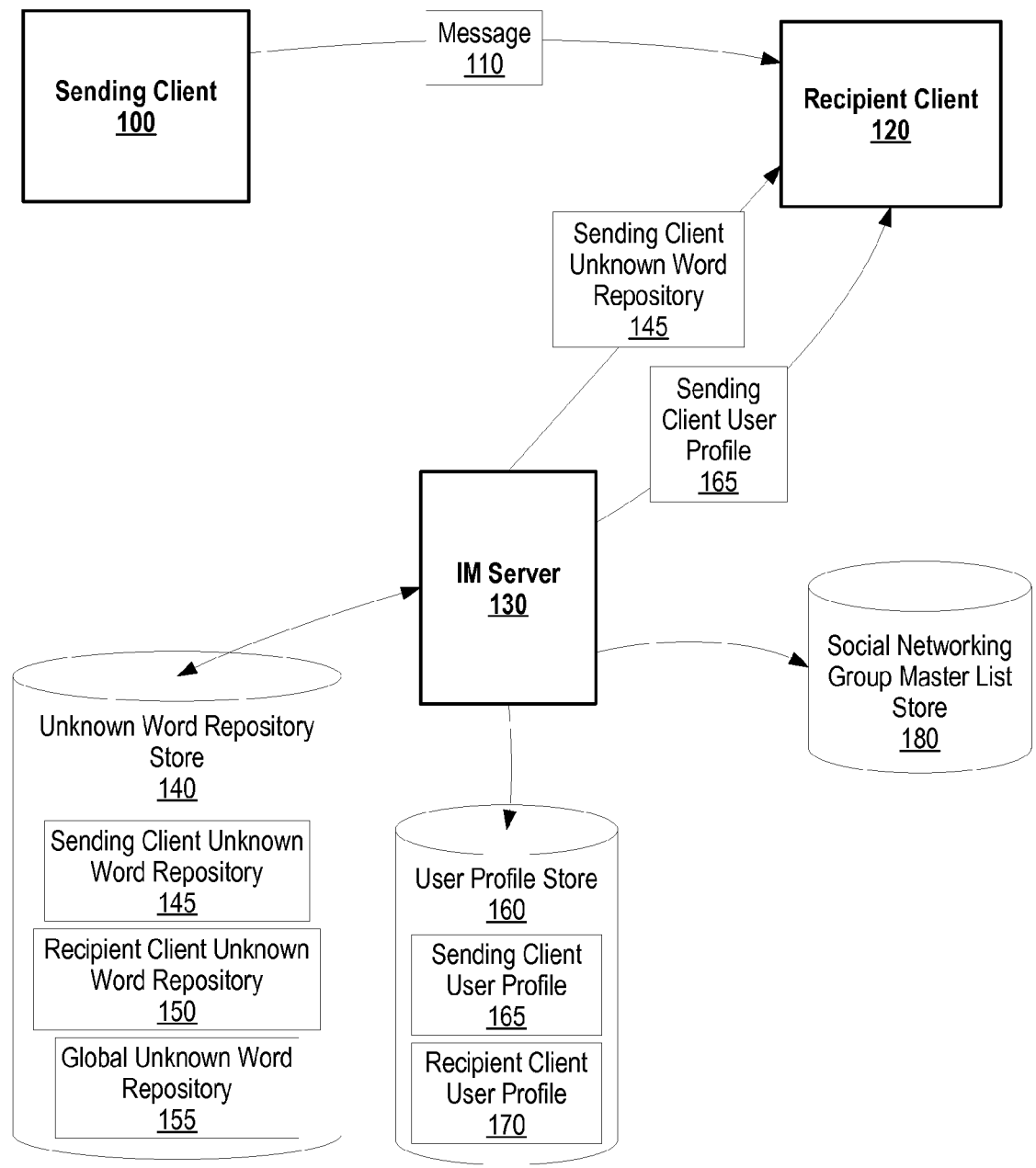
FIG. 1 is a diagram showing a recipient client using unknown word repositories to identify and display unknown word definitions whose order is based upon a common social networking group between a sending client and a recipient client.

FIG. 1 is a diagram showing a recipient client using unknown word repositories to identify and display unknown word definitions whose order is based upon a common social networking group between a sending client and a recipient client. Sending client 100 and recipient client 120 are part of a common social networking group, such as a "WiFi" social networking group or an "IT-Software" social networking group, and utilize instant messaging (IM) server 130 to send messages to one another. When recipient client 120 receives a message that includes an unknown word, recipient client 120's user selects the unknown word, which invokes recipient client 120 to proceed through a series of steps to identify definitions and display the definitions to the user based upon the common social networking group.

Sending client 100 and recipient client 120 utilize IM server 130 and social networking group master list store to create unknown word repositories 145-150 and user profiles 165 and 170, which are located in unknown word repository store 140 and user profile store 160, respectively. Sending client 100's user and recipient client 120's user create particular user profiles, which include social networking groups and corresponding social networking group frequency values. The social networking group frequency values correspond to the amount of time that a user converses in a particular social networking group. The invention described herein utilizes the user profiles to identify a common social networking group between sending client 100 and recipient client 120. For example, if the sending client user profile includes social networking groups X, Y, and Z, and the recipient client user profile includes social networking groups V, W, and X, then recipient client 120 identifies the common social networking group as being "X" (see FIGS. 2B, 4, and corresponding text for further details).

Sending client 100's user and recipient client 120's user also create particular unknown word repositories, which includes unknown words, definitions, and social networking groups that correspond to the definitions. The invention described herein utilizes the unknown word repositories to determine an unknown word's most likely definition based upon the common social networking group. (see FIGS. 2B, 5, and corresponding text for further details).

When sending client 100 sends message 110 to recipient client 120, recipient client 120 displays message 110 for recipient client 120's user to view. In turn, the user selects an unknown word, which is a word that the user is unsure of its meaning. The unknown word may be an acronym, such as "DOM," or the word may be an actual word with multiple meanings, such as "directory", which may mean a folder in a database, a floor map in a shopping mall, or a telephone list.

Recipient client 120 communicates with instant messaging server 130 in order to retrieve sending client user profile 165 from IM server 130. In one embodiment, sending client user profile 165 is located at sending client 100. Recipient client 120 also retrieves recipient client user profile 170, which may already be located on recipient client 120.

Recipient client 120 identifies a common social networking group by matching sending client user profile 165 with recipient client user profile 170. Recipient client 120 uses the common social networking group to identify the unknown word's definitions using one or more unknown word repositories, such as sending client unknown word repository 145, recipient client unknown word repository 150, global unknown word repository 155, or a mutual client unknown word repository, which corresponds to a mutual client included in the common social networking group. Once recipient client 120 identifies the unknown word's definitions, recipient client 120 orders and displays the definitions based upon the common social networking group and the social networking group frequency values.

In one embodiment, the invention described herein accumulates the unknown word and the unknown word's corresponding definitions into other unknown word repositories. For example, when recipient client 120 determines that an unknown word is not included in sending client unknown word repository 145 or recipient client unknown word repository 150, but identifies the unknown word in a mutual client unknown word repository, the invention described herein adds the unknown word and its corresponding definitions to sending client unknown word repository 145 and recipient client unknown word repository 150.

FIG. 2A is a diagram showing an unknown word repository that includes an unknown word and multiple definitions that correspond to particular social networking groups. Unknown word repository 200 may correspond to a user utilizing a sending client, a recipient client, or a mutual client.

Unknown word repository 200 includes an unknown word in column 210, definitions in column 220, and corresponding social networking groups in column 230. When a recipient client identifies an unknown word in unknown word repository 200, the recipient client uses a common social networking group to determine which definition is the most likely definition for the unknown word. Using FIG. 2A as an example, if the recipient client identified "WiFi" as a common social networking group between the recipient client and a sending client, the recipient client displays "Disk on Module" at the top of a definition list that is presented to the user.

FIG. 2B is a diagram showing a user profile that includes social networking groups and corresponding social networking group frequency values. User profile 240 may correspond to a user utilizing a sending client, a recipient client, or a mutual client. User profile 240 includes social networking groups in column 250 and corresponding social networking group frequency values in column 260. The social networking group frequency values correspond to the amount of time that the user converses in a particular social networking group. The example in FIG. 2B shows that the user converses in the "IT-software" social networking group 70% of the time. The invention described herein utilizes the social networking group frequency values during the process of ordering an unknown word's multiple definitions (see FIG. 7 and corresponding text for further details).

Figure 3:
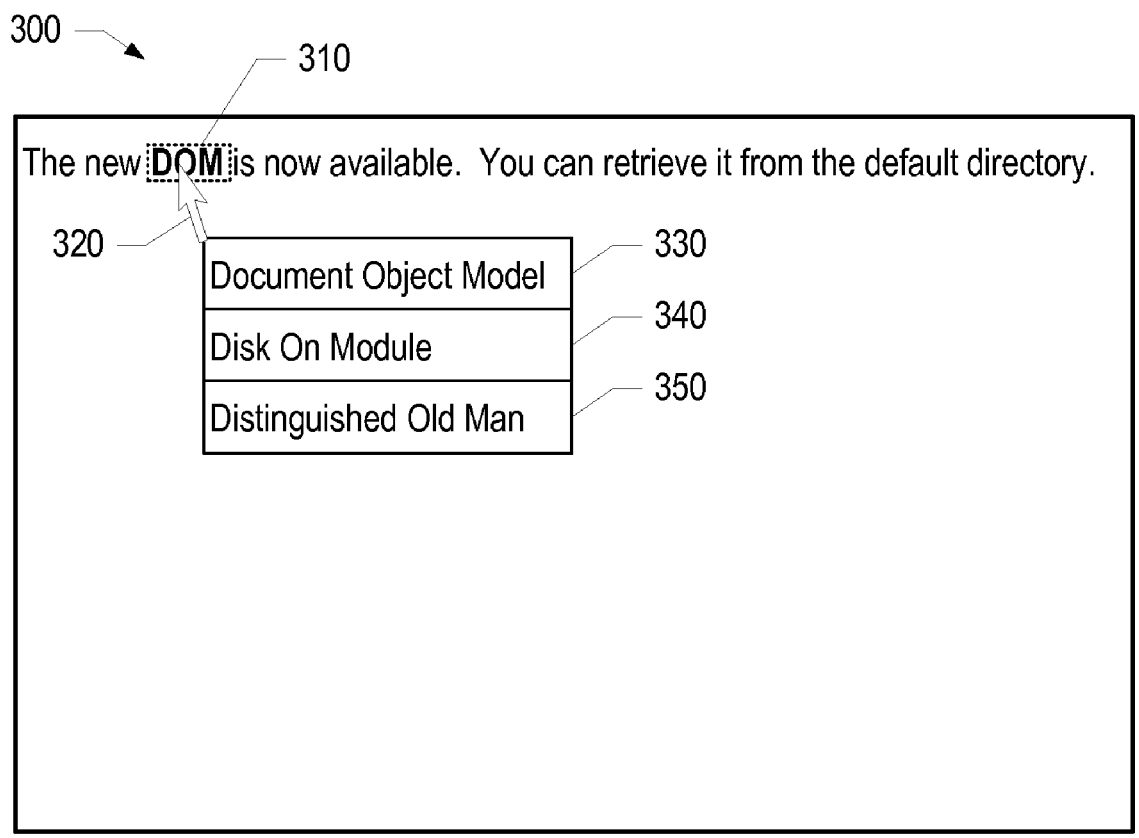
FIG. 3 is a diagram showing a user selecting an unknown word, which results in the user's client identifying a common social networking group and displaying a plurality of definitions of the unknown word.

FIG. 3 is a diagram showing a user selecting an unknown word, which results in the user's client identifying a common social networking group and displaying a plurality of definitions of the unknown word. A recipient client uses display 300 to display a message to a recipient user. The recipient user reads the message, and uses pointer 320 to select unknown word 310 since the recipient client is unsure of unknown word 310's meaning. After determining a common social networking group between the recipient client and the sending client, the recipient client displays definitions 330 through 350 in a social networking group frequency order based upon the identified common social networking group and social networking group frequency values.

Figure 4:
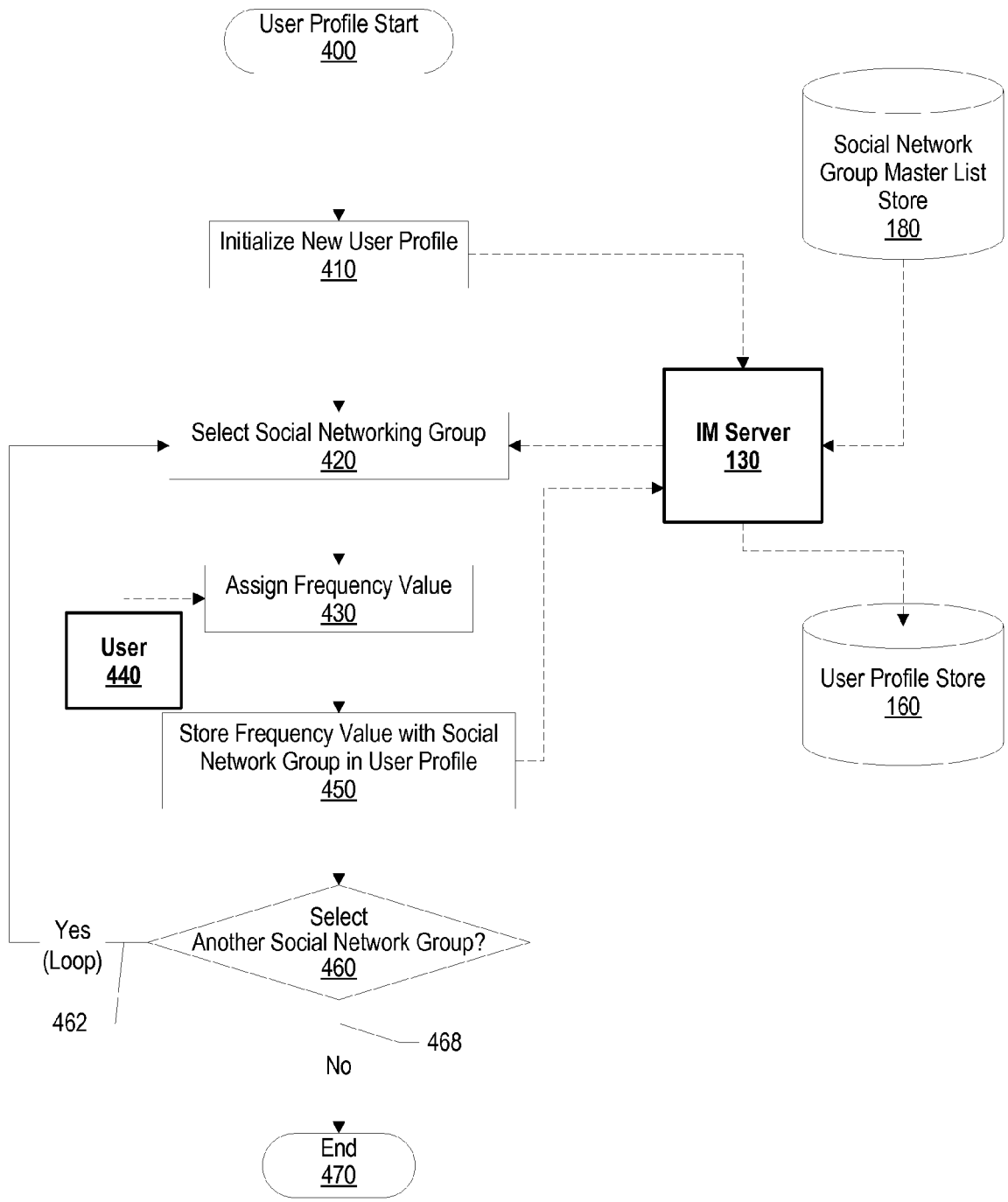
FIG. 4 is a flowchart showing steps taken in creating a user profile that includes social networking groups and corresponding social networking group frequency values.

FIG. 4 is a flowchart showing steps taken in creating a user profile that includes social networking groups and corresponding social networking group frequency values. The user may correspond to a sending client, a recipient client, or a mutual client (e.g. a client in a mutual social networking group as the sending client and the recipient client).

Processing commences at 400, whereupon processing initializes a new user profile using instant messaging (IM) server 130 at step 410. At step 420, processing selects a social networking group from social networking group master list store 180, which includes social networking groups of a computer system. IM server 130 and social networking group master list store 130 are the same as that shown in FIG. 1.

At step 430, the user assigns a frequency value to the selected social networking group. The frequency value corresponds to the amount of time the user spends conversing in the social networking group. For example, if a user conversed 60 percent of the user's time in a "Software" social networking group, the social networking group's corresponding frequency value is "60%." Processing stores the frequency value with the social networking group in the user's user profile located in user profile store 160. User profile store 160 is the same as that shown in FIG. 1, and may be located with IM server 130 as shown in FIG. 4 or at the client itself.

A determination is made as to whether there are more social networking groups to process (decision 460). If there are more social networking groups to process, decision 460 branches to "Yes" branch 462, which loops back to select and process another social networking group. This looping continues until there are no more social networking groups to process, at which point decision 460 branches to "No" branch 468 whereupon processing ends at 470.

Figure 5:
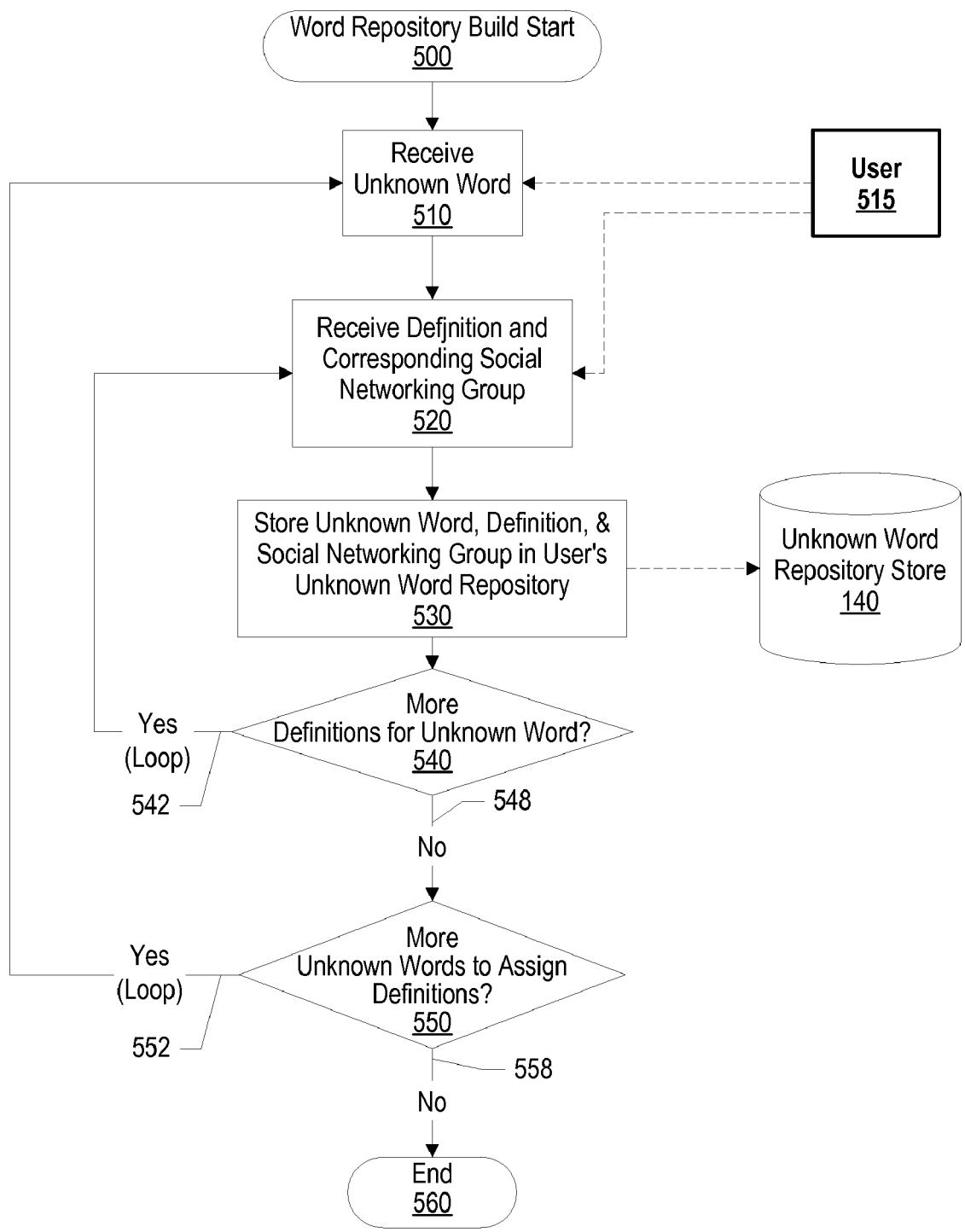
FIG. 5 is a flowchart showing steps taken in building an unknown word repository.

FIG. 5 is a flowchart showing steps taken in building an unknown word repository. The word repository may correspond to a sending client, a recipient client, or a mutual client (e.g. a client in a mutual social networking group as the sending client and the recipient client).

Processing commences at 500, whereupon processing receives an unknown word from user 515 at step 510. An unknown word is a word whose definition depends upon the context in which the unknown word is used. At step 520, processing receives a definition and a corresponding social networking group from user 515. For example, user 515 may use "DOM" during instant messaging conversations in a "WiFi" social networking group. In this example, user 515 provides "DOM" at step 510, and provides a definition "Disk on Module" and social networking group "WiFi" at step 520.

Processing stores the unknown word, definition, and corresponding social networking group in user 515's unknown word repository located in unknown word repository store 140 (step 530). Unknown word repository store 140 is the same as that shown in FIG. 1 and may be located at the client or in a centralized location, such as with a server.

A determination is made as to whether there are more definitions and social networking groups to associate with the unknown word (decision 540). If there are more unknown words, decision 540 branches to "Yes" branch 542, which loops back to receive and process another definition and social networking group. This looping continues until there are no more definitions and social networking groups to process, at which point decision 540 branches to "No" branch 548.

A determination is made as to whether there are more unknown words in which to assign definitions (decision 550). If there are more unknown words in which to assign definitions, decision 550 branches to "Yes" branch 552, which loops back to process another unknown word. This looping continues until there are no more unknown words in which to process, at which point decision 550 branches to "No" branch 558 whereupon processing ends at 560.

Figure 6:
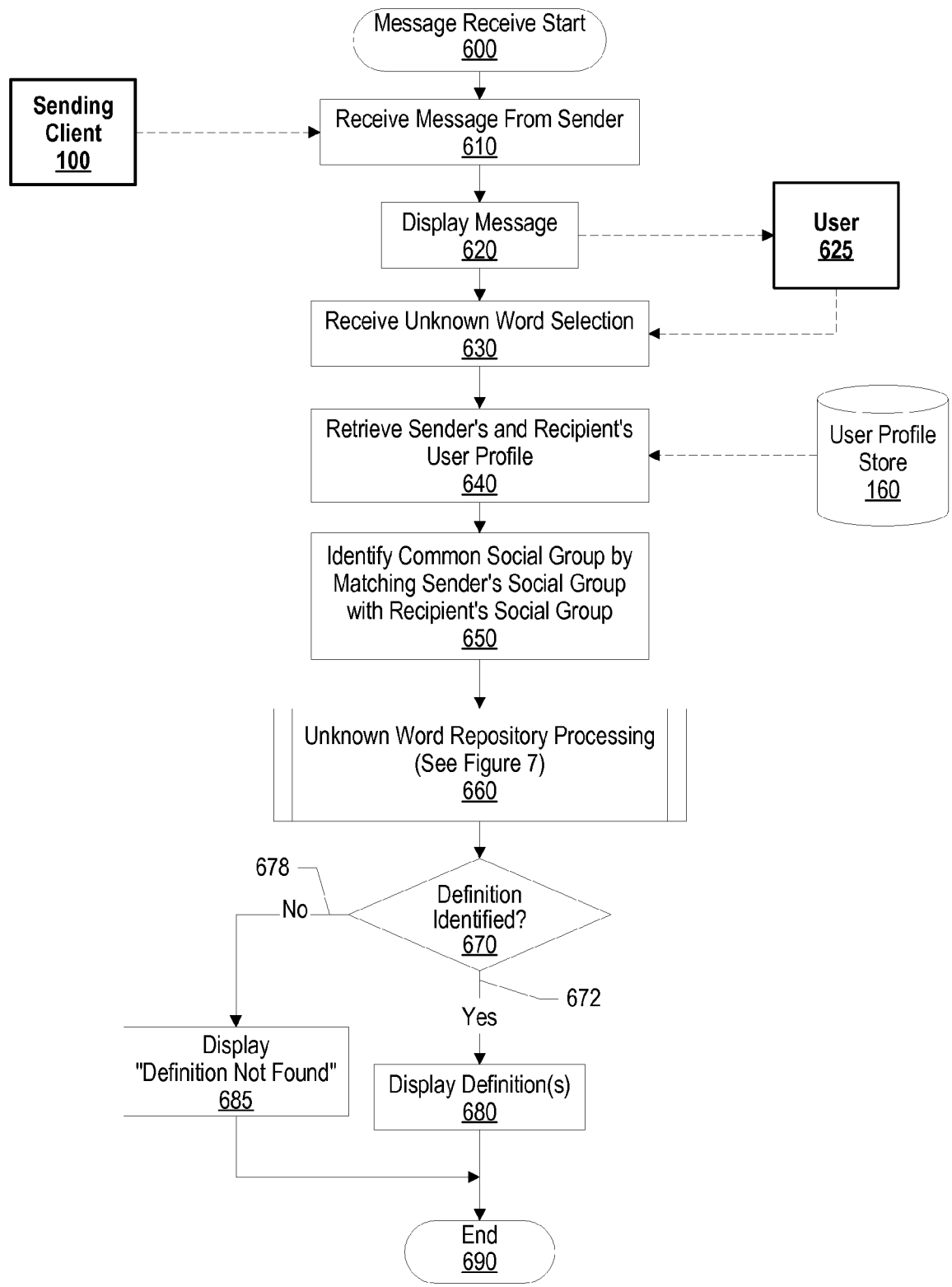
FIG. 6 is a flowchart showing steps taken in processing an unknown word selection and displaying definitions that correspond to the selected unknown word.

FIG. 6 is a flowchart showing steps taken in processing an unknown word selection and displaying definitions that correspond to the selected unknown word. Processing commences at a recipient client at 600, whereupon the recipient client receives a message from sending client 100 at step 610. At step 620, processing displays the message to the recipient client's user 625 to view.

User 625 views the message and selects an unknown word, which processing receives the selection at step 630. Processing retrieves a sending client user profile, which corresponds to sending client 100, and a recipient client user profile from user profile store 160 (step 640). In one embodiment, user profile store 160 may be located at a centralized location. In another embodiment, processing receives the sending client user profile from sending client 100 and retrieves the recipient client user profile at the recipient client.

At step 650, processing identifies a common social networking group by matching the sending client user profile with the recipient client user profile. Processing uses the common social networking group to identify the unknown word's definition using unknown word repositories, such as one corresponding to sending client 100, the recipient client, or a mutual client that is included in the common social networking group (pre-defined process block 660, see FIG. 7 and corresponding text for further details).

After unknown word repository processing, a determination is made as to whether processing identified definitions for the unknown word (decision 670). If processing identified one or more definitions, decision 670 branches to "Yes" branch 672 whereupon processing displays the definitions to user 625 at step 680 and processing ends at 690. In one embodiment, processing displays the definitions based upon social networking group frequency values that identify the frequency that a client communicates in particular social networking groups (see FIG. 7 and corresponding text for further details). On the other hand, if processing did not identify a definition for the unknown word, decision 670 branches to "No" branch 678 whereupon processing displays "Definition not found" to user 625 and processing ends at 690.

Figure 7:
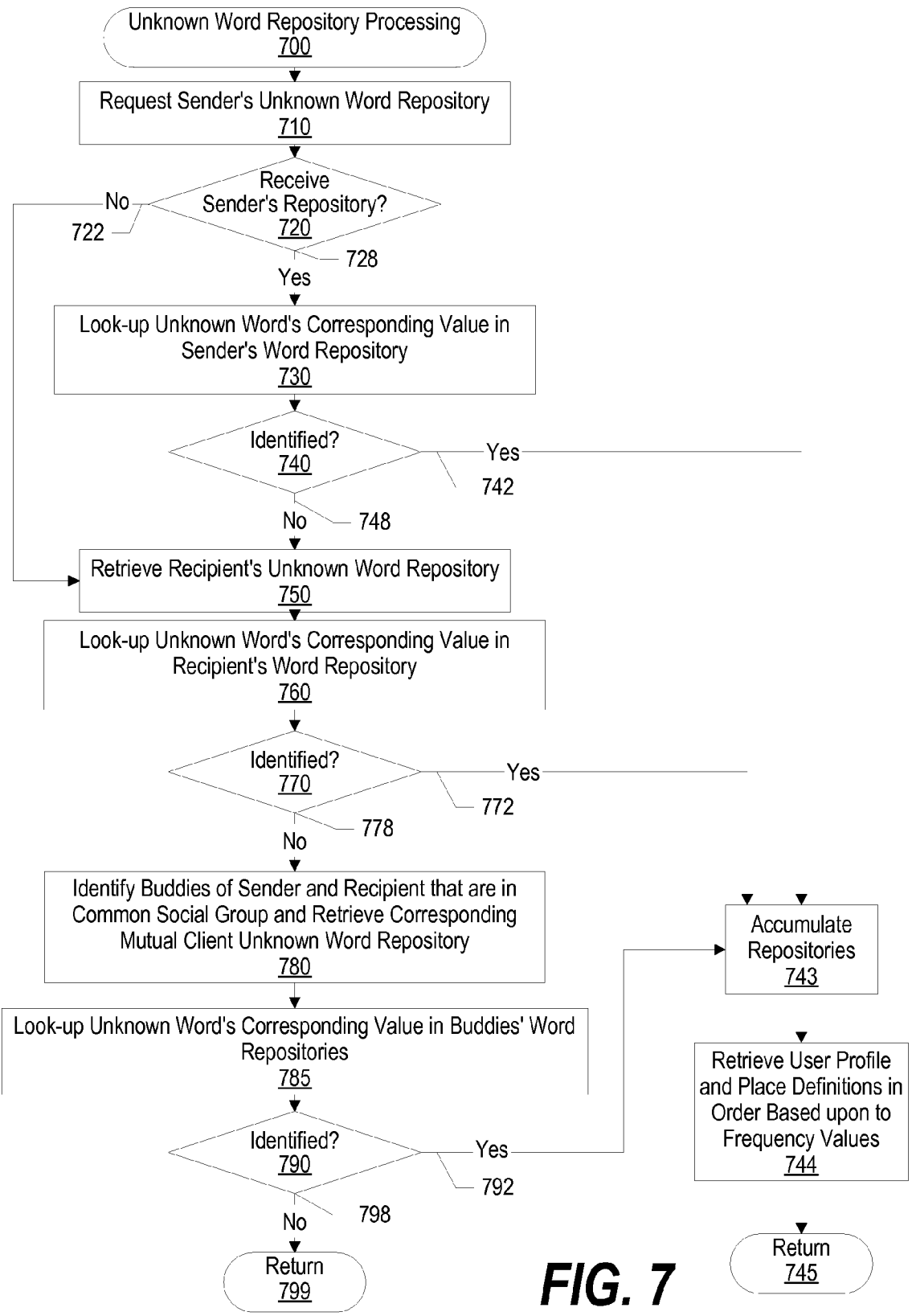
FIG. 7 is a flowchart showing steps taken in identifying definitions for an unknown word and organizing the definitions based upon social networking group frequency values.

FIG. 7 is a flowchart showing steps taken in identifying definitions for an unknown word and organizing the definitions based upon social networking group frequency values. Recipient client processing commences at 700, whereupon the recipient client requests the sending client's unknown word repository (step 710). The sending client's unknown word repository may be located at the sending client or at a centralized location, such as an instant messaging server.

A determination is made as to whether the recipient client received the sending client's unknown word repository (decision 720). If the sending client's unknown word repository is not received, decision 720 branches to "No" branch 722, bypassing sending client unknown word repository processing steps. On the other hand, if the recipient client received the sending client's unknown word repository, decision 720 branches to "Yes" branch 728 whereupon processing looks-up the unknown word in the sending client unknown word repository (step 730).

A determination is made as to whether the unknown word resides in the sending client's unknown word repository (decision 740). If the unknown word resides in the sending client's unknown word repository, decision 740 branches to "Yes" branch 742 whereupon, in one embodiment, processing accumulates repositories at step 743. For example, if the unknown word is a word that does not currently reside in a recipient client unknown word repository, processing adds the unknown word, along with its definitions, into the recipient client unknown word repository.

At step 744, processing retrieves the sending client's user profile and places the unknown word's definitions in a "social networking group frequency order" by placing the definition corresponding to the identified common social networking group at the top of the order, and then using the other definitions' social networking group frequency value included in the sending client user profile to organize the other definitions. A social networking group frequency value corresponds to the amount of time that a user converses in a particular social networking group (see FIGS. 2B, 4, and corresponding text for further details). Processing returns at 745.

On the other hand, if processing did not locate the unknown word in the sending client unknown word repository, decision 740 branches to "No" branch 748 whereupon processing retrieves a recipient client unknown word repository at step 750. At step 730, processing looks-up the unknown word in the recipient client unknown word repository.

A determination is made as to whether the unknown word resides in the recipient client's unknown word repository (decision 770). If the unknown word resides in the recipient client's unknown word repository, decision 770 branches to "Yes" branch 772 whereupon, in one embodiment, processing accumulates repositories at step 743. For example, if the unknown word does not currently reside in the sending client's unknown word repository, processing requests to add the unknown word, along with its definitions, into the sending client unknown word repository.

At step 744, processing retrieves the recipient client's user profile and places the unknown word's definitions in a "social networking group frequency order" by placing the definition that corresponds the identified common social networking group at the top of the order, and then using the other definitions' social networking group frequency value included in the recipient client user profile to organize the other definitions. Processing returns at 745.

On the other hand, if processing did not locate the unknown word in the recipient client unknown word repository, decision 770 branches to "No" branch 778 whereupon processing identifies a mutual client that is included in the common social networking group and retrieves the mutual client's unknown word repository (step 780). For example, if the sending client and recipient client are part of a "project X" social networking group, processing identifies other clients that are also part of social networking group "project X."

At step 785, processing looks-up the unknown word in the mutual client unknown word repository. A determination is made as to whether the unknown word resides in the mutual client's unknown word repository (decision 790). If the unknown word resides in the mutual client's unknown word repository, decision 790 branches to "Yes" branch 792 whereupon, in one embodiment, processing accumulates repositories at step 743. For example, if the unknown word does not currently reside in the sending client's unknown word repository or the recipient client's unknown word repository, processing adds the unknown word, along with its definitions, into the sending client unknown word repository and the recipient client unknown word repository.

At step 744, processing retrieves the mutual client's user profile and places the unknown word's definitions in a "social networking group frequency order" by placing the definition that corresponds the identified common social networking group at the top of the order, and then using the other definitions' social networking group frequency value included in the mutual client user profile to organize the other definitions. Processing returns at 745.

On the other hand, if the unknown word is not included in the mutual client unknown word repository, decision 790 branches to "No" branch 798 whereupon processing returns at 799.

Figure 8:
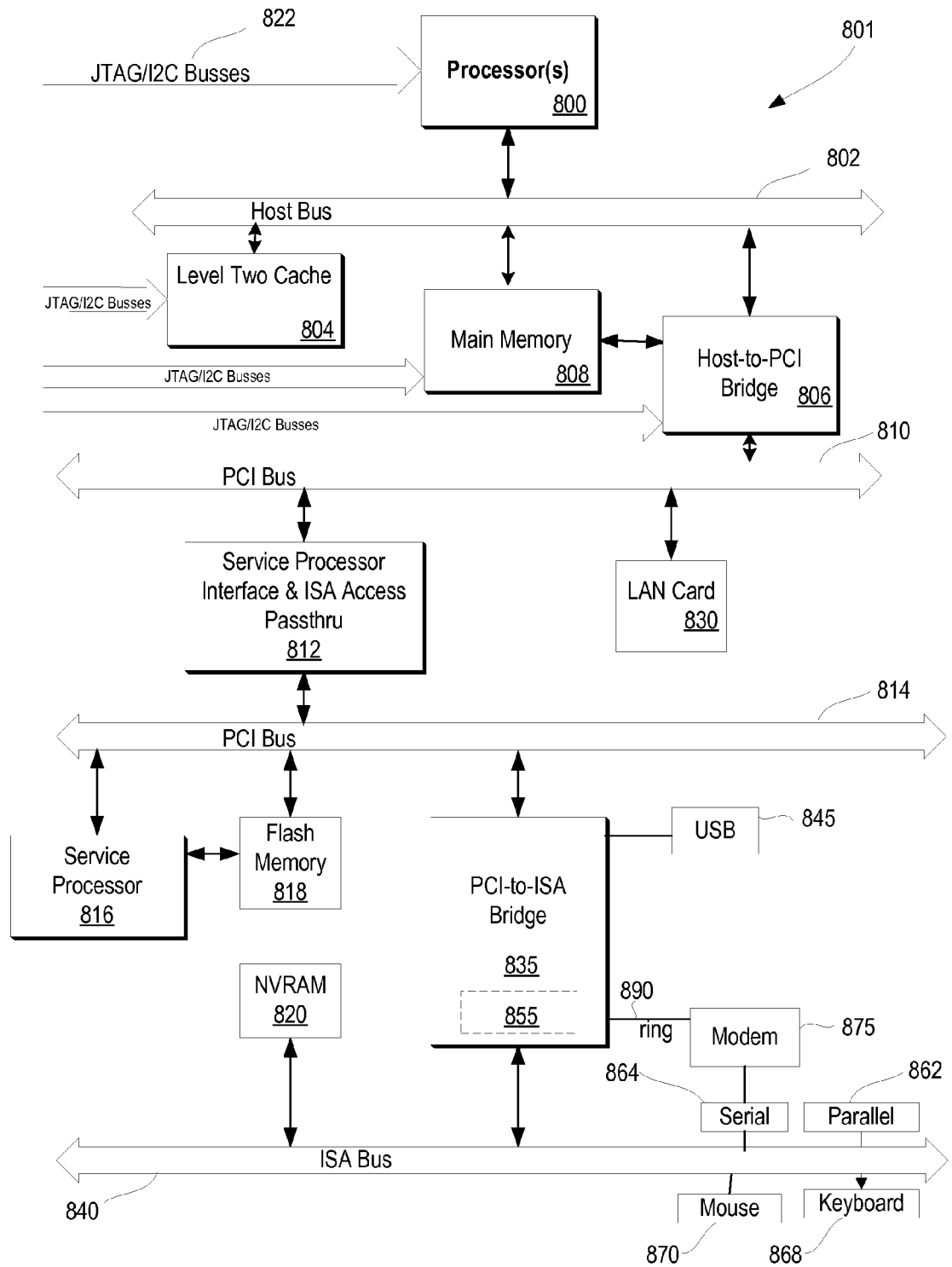
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a message from a sending client at a recipient client, the recipient client including a processor;
   detecting, by the processor, an unknown word selection at the recipient client, wherein the unknown word selection corresponds to an unknown word included in the message, the unknown word having a plurality of definitions;
   identifying, by the processor, a common social networking group between the sending client and the recipient client by matching a sending client user profile with a recipient client user profile, the sending client user profile corresponding to the sending client and the recipient client user profile corresponding to the recipient client;
   determining, by the processor, whether the unknown word is included in an unknown word repository, wherein each unknown word in the unknown word repository corresponds to a plurality of definitions;
   in response to determining that the unknown word is included in the unknown word repository, selecting, by the processor, one of the plurality of definitions included in the unknown word repository that corresponds to the unknown word, wherein the selection is based upon the identified common social networking group; and
   providing the selected definition to a user at the recipient client.

2. The method of claim 1 wherein the unknown word repository is a sending client unknown word repository that corresponds to the sending client, the method further comprising:
   in response to determining that the unknown word is not included in the unknown word repository, retrieving a recipient client unknown word repository that corresponds to the recipient client;
   determining whether the unknown word is included in the recipient client unknown word repository, wherein each unknown word included in the recipient client unknown word repository corresponds to a plurality of recipient client definitions;
   in response to determining that the unknown word is included in the recipient client unknown word repository, selecting one of the plurality of recipient client definitions that corresponds to the unknown word, wherein the selection is based upon the identified common social networking group; and
   displaying the selected recipient client definition at the recipient client.

3. The method of claim 2 further comprising:
   retrieving a recipient client user profile that corresponds to the recipient client;
   using the recipient client user profile to identify a social networking group frequency order, wherein the common social networking group is first in the social networking group frequency order and other social networking groups are ordered based upon a corresponding social networking group frequency value for each of the other social networking groups that is included in the recipient client user profile;
   organizing the plurality of recipient client definitions into a definition order based upon the social networking group frequency order; and
   displaying the plurality of recipient client definitions in the definition order.

4. The method of claim 2 further comprising:
   in response to determining that the unknown word is not included in the recipient client unknown word repository, identifying a mutual client that is included in the identified common social networking group;
   receiving a mutual client unknown word repository that corresponds to the mutual client;
   determining whether the unknown word is included in the mutual client unknown word repository, wherein each unknown word included in the mutual client unknown word repository corresponds to a plurality of mutual client definitions;
   in response to determining that the unknown word is included in the mutual client unknown word repository, selecting one of the plurality of mutual client definitions that corresponds to the unknown word, wherein the selection is based upon the identified common social networking group; and displaying the selected mutual client definition at the recipient client.

5. The method of claim 4 further comprising:
in response to determining that the unknown word is included in the mutual client unknown word repository, including the unknown word and corresponding mutual client definitions from the mutual client unknown word repository in the sending client unknown word repository and the recipient client unknown word repository.

6. The method of claim 1 further comprising:
requesting a sending client user profile from the sending client;
in response to the request, receiving the sending client user profile;
using the sending client user profile to identify a social networking group frequency order, wherein the common social networking group is first in the social networking group frequency order and other social networking groups are ordered based upon a corresponding social networking group frequency value for each of the other social networking groups that is included in the sending client user profile;
organizing the plurality of sending client definitions into a definition order based upon the social networking group frequency order; and
displaying the plurality of sending client definitions in the definition order.

7. The method of claim 1 wherein each of the plurality of definitions of the unknown word are based upon a context in which the unknown word is utilized.

8. A computer program product stored on a computer operable media, the computer operable media containing instructions for execution by a computer, which, when executed by the computer, cause the computer to implement a method of identifying a definition of an unknown word, the method comprising:
receiving a message from a sending client at a recipient client;
detecting an unknown word selection at the recipient client, wherein the unknown word selection corresponds to an unknown word included in the message, the unknown word having a plurality of definitions;
identifying a common social networking group between the sending client and the recipient client by matching a sending client user profile with a recipient client user profile, the sending client user profile corresponding to the sending client and the recipient client user profile corresponding to the recipient client;
determining whether the unknown word is included in an unknown word repository, wherein each unknown word in the unknown word repository corresponds to a plurality of definitions;
in response to determining that the unknown word is included in the unknown word repository, selecting one of the plurality of definitions included in the unknown word repository that corresponds to the unknown word, wherein the selection is based upon the identified common social networking group; and
providing the selected definition to a user at the recipient client.

9. The computer program product of claim 8 wherein the unknown word repository is a sending client unknown word repository that corresponds to the sending client, the method further comprising:

in response to determining that the unknown word is not included in the unknown word repository, retrieving a recipient client unknown word repository that corresponds to the recipient client;
determining whether the unknown word is included in the recipient client unknown word repository, wherein each unknown word included in the recipient client unknown word repository corresponds to a plurality of recipient client definitions;
in response to determining that the unknown word is included in the recipient client unknown word repository, selecting one of the plurality of recipient client definitions that corresponds to the unknown word, wherein the selection is based upon the identified common social networking group; and
displaying the selected recipient client definition at the recipient client.

10. The computer program product of claim 9 wherein the method further comprises:
retrieving a recipient client user profile that corresponds to the recipient client;
using the recipient client user profile to identify a social networking group frequency order, wherein the common social networking group is first in the social networking group frequency order and other social networking groups are ordered based upon a corresponding social networking group frequency value for each of the other social networking groups that is included in the recipient client user profile;
organizing the plurality of recipient client definitions into a definition order based upon the social networking group frequency order; and
displaying the plurality of recipient client definitions in the definition order.

11. The computer program product of claim 9 wherein the method further comprises:
in response to determining that the unknown word is not included in the recipient client unknown word repository, identifying a mutual client that is included in the identified common social networking group;
receiving a mutual client unknown word repository that corresponds to the mutual client;
determining whether the unknown word is included in the mutual client unknown word repository, wherein each unknown word included in the mutual client unknown word repository corresponds to a plurality of mutual client definitions;
in response to determining that the unknown word is included in the mutual client unknown word repository, selecting one of the plurality of mutual client definitions that corresponds to the unknown word, wherein the selection is based upon the identified common social networking group; and
displaying the selected mutual client definition at the recipient client.

12. The computer program product of claim 11 wherein the method further comprises:
in response to determining that the unknown word is included in the mutual client unknown word repository, including the unknown word and corresponding mutual client definitions from the mutual client unknown word repository in the sending client unknown word repository and the recipient client unknown word repository.

13. The computer program product of claim 8 wherein the method further comprises:
requesting a sending client user profile from the sending client;

in response to the request, receiving the sending client user profile;

using the sending client user profile to identify a social networking group frequency order, wherein the common social networking group is first in the social networking group frequency order and other social networking groups are ordered based upon a corresponding social networking group frequency value for each of the other social networking groups that is included in the sending client user profile;

organizing the plurality of sending client definitions into a definition order based upon the social networking group frequency order; and displaying the plurality of sending client definitions in the definition order.

14. The computer program product of claim 9 wherein each of the plurality of definitions of the unknown word are based upon a context in which the unknown word is utilized.

15. An information handling system comprising:
one or more processors;
a memory accessible by one or more of the processors;
one or more nonvolatile storage devices accessible by one or more of the processors; and
a set of instructions stored in the memory, wherein one or more processors execute the set of instructions in order to perform actions of:
receiving a message from a sending client at a recipient client;
detecting an unknown word selection at the recipient client, wherein the unknown word selection corresponds to an unknown word included in the message, the unknown word having a plurality of definitions;
identifying a common social networking group between the sending client and the recipient client by matching a sending client user profile with a recipient client user profile, the sending client user profile corresponding to the sending client and the recipient client user profile corresponding to the recipient client;
determining whether the unknown word is included in an unknown word repository, wherein each unknown word in the unknown word repository corresponds to a plurality of definitions;
in response to determining that the unknown word is included in the unknown word repository, selecting one of the plurality of definitions included in the unknown word repository that corresponds to the unknown word, wherein the selection is based upon the identified common social networking group; and
providing the selected definition to a user at the recipient client.

16. The information handling system of claim 15 wherein the unknown word repository is a sending client unknown word repository that corresponds to the sending client, the information handling system comprising an additional set of instructions in order to perform actions of:
in response to determining that the unknown word is not included in the unknown word repository, retrieving a recipient client unknown word repository that corresponds to the recipient client;
determining whether the unknown word is included in the recipient client unknown word repository, wherein each unknown word included in the recipient client unknown word repository corresponds to a plurality of recipient client definitions;

in response to determining that the unknown word is included in the recipient client unknown word repository, selecting one of the plurality of recipient client definitions that corresponds to the unknown word, wherein the selection is based upon the identified common social networking group; and
displaying the selected recipient client definition at the recipient client.

17. The information handling system of claim 16 further comprising an additional set of instructions in order to perform actions of:
retrieving a recipient client user profile that corresponds to the recipient client;
using the recipient client user profile to identify a social networking group frequency order, wherein the common social networking group is first in the social networking group frequency order and other social networking groups are ordered based upon a corresponding social networking group frequency value for each of the other social networking groups that is included in the recipient client user profile;
organizing the plurality of recipient client definitions into a definition order based upon the social networking group frequency order; and
displaying the plurality of recipient client definitions in the definition order.

18. The information handling system of claim 16 further comprising an additional set of instructions in order to perform actions of:
in response to determining that the unknown word is not included in the recipient client unknown word repository, identifying a mutual client that is included in the identified common social networking group;
receiving a mutual client unknown word repository that corresponds to the mutual client;
determining whether the unknown word is included in the mutual client unknown word repository, wherein each unknown word included in the mutual client unknown word repository corresponds to a plurality of mutual client definitions;
in response to determining that the unknown word is included in the mutual client unknown word repository, selecting one of the plurality of mutual client definitions that corresponds to the unknown word, wherein the selection is based upon the identified common social networking group; and
displaying the selected mutual client definition at the recipient client.

19. The information handling system of claim 18 further comprising an additional set of instructions in order to perform actions of:
in response to determining that the unknown word is included in the mutual client unknown word repository, including the unknown word and corresponding mutual client definitions from the mutual client unknown word repository in the sending client unknown word repository and the recipient client unknown word repository.

20. The information handling system of claim 15 further comprising an additional set of instructions in order to perform actions of:
requesting a sending client user profile from the sending client;
in response to the request, receiving the sending client user profile;

using the sending client user profile to identify a social networking group frequency order, wherein the common social networking group is first in the social networking group frequency order and other social networking groups are ordered based upon a corresponding social networking group frequency value for each of the other social networking groups that is included in the sending client user profile;

organizing the plurality of sending client definitions into a definition order based upon the social networking group frequency order; and displaying the plurality of sending client definitions in the definition order.

* * * * *